(12) United States Patent  
Jiang et al.

(10) Patent No.: US 12,250,686 B2
(45) Date of Patent: Mar. 11, 2025

(54) METHOD AND DEVICE IN NODES USED FOR WIRELESS COMMUNICATION

(71) Applicants: Qi Jiang, Shanghai (CN); Xiaobo Zhang, Shanghai (CN)

(72) Inventors: Qi Jiang, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 673 days.

(21) Appl. No.: 17/525,979

(22) Filed: Nov. 15, 2021

(65) Prior Publication Data

US 2022/0159646 A1 May 19, 2022

(30) Foreign Application Priority Data

Nov. 16, 2020 (CN) .......................... 202011276189.9

(51) Int. Cl.
 *H04L 5/00* (2006.01)
 *H04W 72/0446* (2023.01)
 *H04W 72/21* (2023.01)
(52) U.S. Cl.
 CPC ........... *H04W 72/21* (2023.01); *H04L 5/0053* (2013.01); *H04W 72/0446* (2013.01)
(58) Field of Classification Search
 CPC H04W 71/21; H04W 72/0446; H04L 5/0053; H04L 5/0094
 See application file for complete search history.

(56) References Cited

U.S. PATENT DOCUMENTS

| | | | | |
|---|---|---|---|---|
| 2019/0349901 A1* | 11/2019 | Basu Mallick | ........ | H04L 5/0048 |
| 2020/0045767 A1* | 2/2020 | Velev | ........... | H04W 8/24 |
| 2020/0205150 A1* | 6/2020 | Cheng | .................. | H04W 72/21 |
| 2020/0228248 A1* | 7/2020 | Islam | ................... | H04L 5/0055 |
| 2020/0275440 A1* | 8/2020 | Wu | ................ | H04W 72/0446 |
| 2021/0235385 A1* | 7/2021 | Takeda | ................. | H04W 52/42 |

(Continued)

OTHER PUBLICATIONS

3GPP TSG RAN WG1 Meeting#92 Title: Draft CR on rate matching around SS block (Year: 2018).*

(Continued)

*Primary Examiner* — Faruk Hamza
*Assistant Examiner* — Abusayeed M Haque

(57) ABSTRACT

A node first receives a first signaling and a second signaling, wherein the first signaling and the second signaling are used to determine a first time-domain resource set and a second time-domain resource set; and then transmits a first signal in the first time-domain resource set, and transmits a second signal in a target time-domain resource set; the second time-domain resource set is reserved for transmission of a first bit set, a first bit block comprised in the first bit set being used to generate the second signal; the second time-domain resource set comprises K1 first-type time-domain resource subsets; whether the first time-domain resource set is overlapping with the second time-domain resource set is used to determine time-domain resources comprised in the target time-domain resource set. The present disclosure optimizes the method and device of designs of UCI transmission during PUCCH collisions, thus optimizing the system performance.

19 Claims, 5 Drawing Sheets

(56) References Cited

U.S. PATENT DOCUMENTS

2022/0052824 A1\* 2/2022 Kim ................. H04L 5/0094
2023/0421233 A1\* 12/2023 Li ..................... H04B 7/024

OTHER PUBLICATIONS

3GPP TSG RAN WG1 Meeting #87, R1-1612137 Title: Discussion on throughput enhancement with multiple HARQ-ACK/NACK bits per TB (Year: 2016).\*
3GPP TSG RAN WG1 Meeting#92, R1-1802704 Title: Draft CR on rate matching around SS block (Year: 2018).\*

\* cited by examiner

METHOD AND DEVICE IN NODES USED FOR WIRELESS COMMUNICATION

CROSS REFERENCE TO RELATED APPLICATIONS

This application claims the priority benefit of Chinese Patent Application No. 202011276189.9, filed on Nov. 16, 2020, the full disclosure of which is incorporated herein by reference.

BACKGROUND

Technical Field

The present disclosure relates to transmission methods and devices in wireless communication systems, and in particular to a design scheme and device for uplink feedback in wireless communications.

Related Art

Standards set in NR Rel-16 are already available for supporting multi-Transmit-Receive Point (multi-TRP) and/or multi-antenna-panel downlink transmissions, thus further providing support to one piece of DCI scheduling multi-TRP and/or multi-antenna-panel downlink transmissions, as well as multiple pieces of DCI respectively scheduling multi-TRP or multi-antenna-panel downlink transmissions.

A Work Item (WI) of advancement in Multiple Input and Multiple Output (MIMO) proposed in NR Release 17 was approved by the 3GPP RAN #86 Plenary, in which a focus of efforts is how to use multiple TRPs and/or antenna panels for advancing uplink channels, such as a Physical Uplink Control CHannel (PUCCH) and a Physical Uplink Shared CHannel (PUSCH); as for PUCCH advancement, one feasible way is to enhance the robustness of the PUCCH through multiple repetitions of transmission.

SUMMARY

Inventors find through researches that in the current system, when confronting two conflicting PUCCH transmissions, if these transmissions are of the same priority, the customary solution is to retain one PUCCH transmission with an earlier start time while drop the other with a later start time, and the priority mentioned above only relates to the type of information carried in the PUCCH. In a Rel-17 system, both Inter-Slot PUCCH Repetition and Intra-Slot PUCCH Repetition are considered, so when the two repetitions of transmission collide with each other, the present solution would cause discarding of the whole Intra-Slot PUCCH Repetition, which will impact the feedback performance as a whole.

To address the above problem, the present disclosure provides a solution. It should be noted that though the present disclosure only took the massive MIMO and beam-based communications as a typical or exemplary scenario in the statement above, it is also applicable to other scenarios such as LTE multi-antenna system, where similar technical effects can be achieved. Additionally, the adoption of a unified solution for various scenarios, including but not limited to massive MIMO, beam-based communications, and LTE multi-antenna system, contributes to the reduction of hardcore complexity and costs. In the case of no conflict, the embodiments of any node and the characteristics in the embodiments may be applied to any other node, and vice versa. In the case of no conflict, the embodiments of the present disclosure and the characteristics in the embodiments may be combined with each other arbitrarily.

To address the above problem, the present disclosure provides a method and a device for Uplink Control Information (UCI) transmission. It should be noted that without conflict, embodiments in the User Equipment (UE) in the present disclosure and the characteristics of the embodiments are also applicable to a base station, and vice versa. In case of no conflict, though the present disclosure is originally targeted at cellular networks, it is also applicable to Internet of Things (IoT) and Vehicle-to-Everything (V2X). Besides, though originally targeted at multi-carrier communications, the present disclosure can also be used for single-carrier communications. Further, though originally targeted at multi-antenna communications, the present disclosure can also be used for single-antenna communications. And the present disclosure not only applies to terminal-base station scenarios, but also to terminal-terminal ones, terminal-relay ones, Non-Terrestrial Networks (NTN) as well as relay-base station communications, where similar technical effects can be achieved. Additionally, the adoption of a unified solution for various scenarios, including but not limited to terminal-base station scenarios, contributes to the reduction of hardcore complexity and costs.

Furthermore, if no conflict is incurred, embodiments in the first node in the present disclosure and the characteristics of the embodiments are also applicable to a second node, and vice versa. Particularly, for interpretations of the terminology, nouns, functions and variants (unless otherwise specified) in the present disclosure, refer to definitions given in TS36 series, TS38 series and TS37 series of 3GPP specifications.

The present disclosure provides a method in a first node for wireless communications, comprising:
  receiving a first signaling and a second signaling; the first signaling is used to determine a first time-domain resource set, and the second signaling is used to determine a second time-domain resource set; and
  transmitting a first signal in the first time-domain resource set, and transmitting a second signal in a target time-domain resource set;
  herein, the first time-domain resource set is reserved for transmission of the first signal, and the second time-domain resource set is reserved for transmission of a first bit set, the first bit set comprising a first bit block, the first bit block being used to generate the second signal; the second time-domain resource set comprises K1 first-type time-domain resource subsets, K1 being a positive integer greater than 1; whether the first time-domain resource set is overlapping with the second time-domain resource set is used to determine whether the target time-domain resource set is comprised of the K1 first-type time-domain resource subsets or K1 second-type time-domain resource subsets; at least one second-type time-domain resource subset of the K1 second-type time-domain resource subsets is different from any of the K1 first-type time-domain resource subsets.

In one embodiment, a technical feature of the above method lies in that the first time-domain resource set is used for bearing an Inter-Slot PUCCH Repetition, and the second time-domain resource set is used for beating an Intra-Slot PUCCH Repetition, when these two repetitions are in collision with each other, the solution is not to abandon one of them, but to compress the Intra-Slot PUCCH Repetition in time domain and then transmit it in a time-domain resource orthogonal with the Inter-Slot PUCCH Repetition, thereby guaranteeing the receiving performance of the Intra-Slot PUCCH Repetition at the receiving end.

According to one aspect of the present disclosure, when the first time-domain resource set and the second time-domain resource set are orthogonal, the target time-domain resource set is comprised of the K1 first-type time-domain resource subsets; when the first time-domain resource set and the second time-domain resource set are overlapping, the target time-domain resource set is comprised of the K1 second-type time-domain resource subsets.

According to one aspect of the present disclosure, when the first time-domain resource set and the second time-domain resource set are overlapping, the second time-domain resource set comprises a third time-domain resource set and the target time-domain resource set, the third time-domain resource set comprises K3 first-type time-domain resource subset(s) of the K1 first-type time-domain resource subsets, and the target time-domain resource set comprises K2 first-type time-domain resource subset(s) of the K1 first-type time-domain resource subsets, where both K2 and K3 are positive integers less than K1, and a sum of the K2 and K3 equals K1.

In one embodiment, the above method is characterized in that the second signal is only transmitted in the target time-domain resource set that is orthogonal with the first time-domain resource set, for avoidance of collision, thus enhancing the performance of UCI transmission.

According to one aspect of the present disclosure, when the first time-domain resource set and the second time-domain resource set are overlapping, the first bit block is used to generate K1 second-type radio sub-signals, and the second radio signal comprises the K1 second-type radio sub-signals, the K1 second-type radio sub-signals being transmitted respectively in the K1 second-type time-domain resource subsets in time domain.

In one embodiment, the above method is characterized in that though time-domain resources actually occupied by the second signal are fewer than the second time-domain resource set being reserved, the number of repetition times, that is, the K1, is still kept the same, thus streamlining the design and preventing high complexity that will cause implementation failure.

According to one aspect of the present disclosure, the second signaling is used to indicate a first PUCCH resource, a time-domain resource occupied by the first PUCCH resource is comprised of the K1 first-type time-domain resource subsets, and the first PUCCH resource adopts a first PUCCH format; the second signal is transmitted in a second PUCCH resource, a time-domain resource occupied by the second PUCCH resource is comprised of the K1 second-type time-domain resource subsets, and the second PUCCH resource adopts a second PUCCH format, the first PUCCH format being different from the second PUCCH format.

In one embodiment, the above method is characterized in that since the second signal occupies fewer time-domain resources in time domain and must maintain the same number of repetitions, the second signal shall adopt a PUCCH format that occupies fewer OFDM symbols for transmission, which means that the first PUCCH format previously employed shall be changed to the second PUCCH format.

According to one aspect of the present disclosure, the second signaling is used to indicate a first PUCCH resource, and a time-domain resource occupied by the first PUCCH resource is comprised of the K1 first-type time-domain resource subsets; the second signal is transmitted in a second PUCCH resource, and a time-domain resource occupied by the second PUCCH resource is comprised of the K1 second-type time-domain resource subsets; the first PUCCH resource and the second PUCCH resource occupy equal numbers of resource blocks in frequency domain.

In one embodiment, the above method is characterized in that the scheme herein does not require extra signaling indication of a position of frequency-domain resources occupied by the second PUCCH resource, thus simplifying the way of implementation and reducing signaling overhead.

According to one aspect of the present disclosure, of the K1 first-type time-domain resource subsets there is at least one first-type time-domain resource subset occupying a larger number of OFDM symbols than any second-type time-domain resource subset of the K1 second-type time-domain resource subsets.

In one embodiment, the above method is characterized in that the second signal uses fewer OFDM symbols as a number of OFDMs occupied by a repetition, thus ensuring the completion of K1 repetitions of transmission in fewer time-domain resources.

According to one aspect of the present disclosure, comprising:
  receiving a third radio signal; and
  receiving a fourth radio signal;
  herein, the first signaling comprises configuration information of the third radio signal, and the second signaling comprises configuration information of the fourth radio signal, the first signal comprises feedback for the third radio signal, and the second signal comprises feedback for the fourth radio signal.

The present disclosure provides a method in a second node for wireless communications, comprising:
  transmitting a first signaling and a second signaling; the first signaling is used to determine a first time-domain resource set, and the second signaling is used to determine a second time-domain resource set; and
  receiving a first signal in the first time-domain resource set, and receiving a second signal in a target time-domain resource set;
  herein, the first time-domain resource set is reserved for transmission of the first signal, and the second time-domain resource set is reserved for transmission of a first bit set, the first bit set comprising a first bit block, the first bit block being used to generate the second signal; the second time-domain resource set comprises K1 first-type time-domain resource subsets, K1 being a positive integer greater than 1; whether the first time-domain resource set is overlapping with the second time-domain resource set is used to determine whether the target time-domain resource set is comprised of the K1 first-type time-domain resource subsets or K1 second-type time-domain resource subsets; at least one second-type time-domain resource subset of the K1 second-type time-domain resource subsets is different from any of the K1 first-type time-domain resource subsets.

According to one aspect of the present disclosure, when the first time-domain resource set and the second time-domain resource set are orthogonal, the target time-domain resource set is comprised of the K1 first-type time-domain resource subsets; when the first time-domain resource set and the second time-domain resource set are overlapping, the target time-domain resource set is comprised of the K1 second-type time-domain resource subsets.

According to one aspect of the present disclosure, when the first time-domain resource set and the second time-domain resource set are overlapping, the second time-domain resource set comprises a third time-domain resource set and the target time-domain resource set, the third time-domain resource set comprises K3 first-type time-domain resource subset(s) of the K1 first-type time-domain resource subsets, and the target time-domain resource set comprises K2 first-type time-domain resource subset(s) of the K1 first-type time-domain resource subsets, where both K2 and K3 are positive integers less than K1, and a sum of the K2 and K3 equals K1.

According to one aspect of the present disclosure, when the first time-domain resource set and the second time-domain resource set are overlapping, the first bit block is used to generate K1 second-type radio sub-signals, and the second radio signal comprises the K1 second-type radio sub-signals, the K1 second-type radio sub-signals being transmitted respectively in the K1 second-type time-domain resource subsets in time domain.

According to one aspect of the present disclosure, the second signaling is used to indicate a first PUCCH resource, a time-domain resource occupied by the first PUCCH resource is comprised of the K1 first-type time-domain resource subsets, and the first PUCCH resource adopts a first PUCCH format; the second signal is transmitted in a second PUCCH resource, a time-domain resource occupied by the second PUCCH resource is comprised of the K1 second-type time-domain resource subsets, and the second PUCCH resource adopts a second PUCCH format, the first PUCCH format being different from the second PUCCH format.

According to one aspect of the present disclosure, the second signaling is used to indicate a first PUCCH resource, and a time-domain resource occupied by the first PUCCH resource is comprised of the K1 first-type time-domain resource subsets; the second signal is transmitted in a second PUCCH resource, and a time-domain resource occupied by the second PUCCH resource is comprised of the K1 second-type time-domain resource subsets; the first PUCCH resource and the second PUCCH resource occupy equal numbers of resource blocks in frequency domain.

According to one aspect of the present disclosure, of the K1 first-type time-domain resource subsets there is at least one first-type time-domain resource subset occupying a larger number of OFDM symbols than any second-type time-domain resource subset of the K1 second-type time-domain resource subsets.

According to one aspect of the present disclosure, comprising:
transmitting a third radio signal and a fourth radio signal;
herein, the first signaling comprises configuration information of the third radio signal, and the second signaling comprises configuration information of the fourth radio signal, the first signal comprises feedback for the third radio signal, and the second signal comprises feedback for the fourth radio signal.

The present disclosure provides a first node for wireless communications, comprising:
a first receiver, receiving a first signaling and a second signaling; the first signaling is used to determine a first time-domain resource set, and the second signaling is used to determine a second time-domain resource set; and
a first transmitter, transmitting a first signal in the first time-domain resource set, and transmitting a second signal in a target time-domain resource set;
herein, the first time-domain resource set is reserved for transmission of the first signal, and the second time-domain resource set is reserved for transmission of a first bit set, the first bit set comprising a first bit block, the first bit block being used to generate the second signal; the second time-domain resource set comprises K1 first-type time-domain resource subsets, K1 being a positive integer greater than 1; whether the first time-domain resource set is overlapping with the second time-domain resource set is used to determine whether the target time-domain resource set is comprised of the K1 first-type time-domain resource subsets or K1 second-type time-domain resource subsets; at least one second-type time-domain resource subset of the K1 second-type time-domain resource subsets is different from any of the K1 first-type time-domain resource subsets.

The present disclosure provides a second node for wireless communications, comprising:
a second transmitter, transmitting a first signaling and a second signaling; the first signaling is used to determine a first time-domain resource set, and the second signaling is used to determine a second time-domain resource set; and
a second receiver, receiving a first signal in the first time-domain resource set, and receiving a second signal in a target time-domain resource set;
herein, the first time-domain resource set is reserved for transmission of the first signal, and the second time-domain resource set is reserved for transmission of a first bit set, the first bit set comprising a first bit block, the first bit block being used to generate the second signal; the second time-domain resource set comprises K1 first-type time-domain resource subsets, K1 being a positive integer greater than 1; whether the first time-domain resource set is overlapping with the second time-domain resource set is used to determine whether the target time-domain resource set is comprised of the K1 first-type time-domain resource subsets or K1 second-type time-domain resource subsets; at least one second-type time-domain resource subset of the K1 second-type time-domain resource subsets is different from any of the K1 first-type time-domain resource subsets.

In one embodiment, compared with the prior art, the present disclosure is advantageous in the following aspects:
when an Inter-Slot PUCCH repetition is in collision with an Intra-Slot PUCCH repetition, in stead of dropping one of them, the PUCCH repetition bearing Intra-Slot is compressed in time domain and then transmitted on a time-domain resource which is orthogonal with the Inter-Slot PUCCH repetition, thus guaranteeing the receiving performance of the Intra-Slot PUCCH repetition in the receiving end;
despite that time-domain resources actually occupied by the second signal are fewer than the reserved second time-domain resource set, the number of repetition times, which is K1, is still maintained, so that the design can be simpler and the complexity won't be too high for implementation;
occupying fewer time-domain resources in time domain and being required to maintain the same number of repetitions, the second signal shall adopt a PUCCH format occupying fewer OFDM symbols for transmission, namely, the first PUCCH format used to be employed is changed to the second PUCCH format;
this scheme does not request for an extra signaling indication to indicate a position of frequency-domain resources occupied by the second PUCCH resource, thus streamlining the implementing method and cutting signaling overhead.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
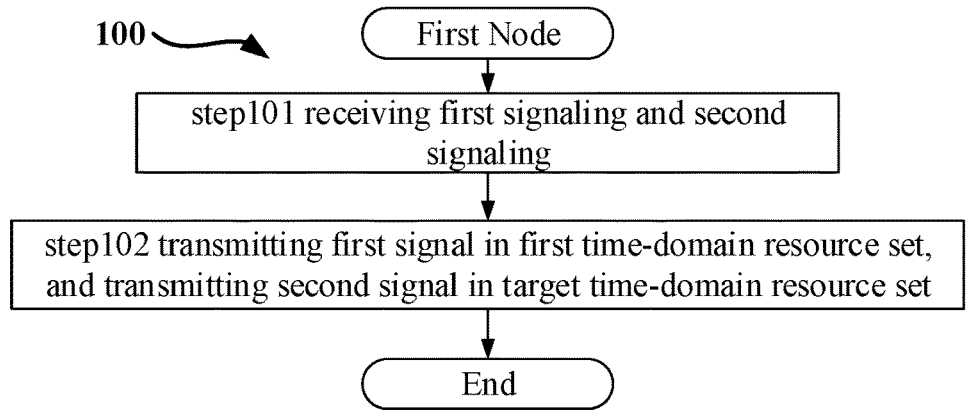
FIG. 1 illustrates a flowchart of processing of a first node according to one embodiment of the present disclosure.

Embodiment 1 illustrates a flowchart of processing of a first node, as shown in FIG. 1. In 100 illustrated by FIG. 1, each box represents a step. In Embodiment 1, a first node in the present disclosure receives a first signaling and a second signaling in step 101; transmits a first signal in a first time-domain resource set and transmits a second signal in a target time-domain resource set in step 102.

In Embodiment 1, the first signaling is used to determine a first time-domain resource set, and the second signaling is used to determine a second time-domain resource set; the first time-domain resource set is reserved for transmission of the first signal, and the second time-domain resource set is reserved for transmission of a first bit set, the first bit set comprising a first bit block, the first bit block being used to generate the second signal; the second time-domain resource set comprises K1 first-type time-domain resource subsets, K1 being a positive integer greater than 1; whether the first time-domain resource set is overlapping with the second time-domain resource set is used to determine whether the target time-domain resource set is comprised of the K1 first-type time-domain resource subsets or K1 second-type time-domain resource subsets; at least one second-type time-domain resource subset of the K1 second-type time-domain resource subsets is different from any of the K1 first-type time-domain resource subsets.

In one embodiment, the first time-domain resource set and the second time-domain resource set are overlapping, and the target time-domain resource set comprises the K1 second-type time-domain resource subsets.

In one embodiment, the first time-domain resource set and the second time-domain resource set are orthogonal, and the target time-domain resource set comprises the K1 first-type time-domain resource subsets.

In one embodiment, the first signaling comprises a Radio Resource Control (RRC) signaling.

In one embodiment, the second signaling comprises an RRC signaling.

In one embodiment, a physical layer channel bearing the first signaling comprises a Physical Downlink Control Channel (PDCCH).

In one embodiment, a physical layer channel bearing the second signaling comprises a PDCCH.

In one embodiment, the first signaling is used to indicate the first time-domain resource set.

In one embodiment, the second signaling is used to indicate the second time-domain resource set.

In one embodiment, the first signaling is a piece of Downlink Control Information (DCI).

In one embodiment, the second signaling is a piece of DCI.

In one embodiment, the first signaling is a Downlink Grant.

In one embodiment, the second signaling is a Downlink Grant.

In one embodiment, the first signaling is an Uplink Grant.

In one embodiment, the second signaling is an Uplink Grant.

In one embodiment, the first time-domain resource set comprises M1 slots, M1 being a positive integer greater than 1.

In one embodiment, the first signal is used for bearing a piece of UCI.

In one embodiment, the first signal is used for bearing M1 repetitions of transmission of a piece of UCI, M1 being a positive integer greater than 1.

In one embodiment, the first time-domain resource set comprises more than one slot.

In one embodiment, the first time-domain resource set comprises M1 first-type time-domain resource subsets, the first signal comprises M1 first-type sub-signals, and the M1 first-type sub-signals are respectively transmitted in the M1 first-type time-domain resource subsets, M1 being a positive integer greater than 1.

In one subembodiment, the M1 first-type time-domain resource subsets are respectively M1 slots.

In one subembodiment, the M1 first-type time-domain resource subsets are respectively M1 mini-slots.

In one subembodiment, the M1 first-type time-domain resource subsets are respectively M1 sub-slots.

In one subembodiment, the M1 first-type time-domain resource subsets are respectively used for transmitting M1 Nominal PUCCHs.

In one subembodiment, the M1 first-type sub-signals are respectively used for bearing M1 repeatedly transmitted PUCCHs.

In one embodiment, the second time-domain resource set is reserved for transmission of a piece of UCI.

In one embodiment, the second time-domain resource set is reserved for K1 repetitions of transmission of a piece of UCI.

In one subembodiment, the K1 first-type time-domain resource subsets are respectively reserved for K1 repetitions of transmission of the UCI.

In one subembodiment, the K1 repetitions respectively correspond to K1 PUCCHs.

In one embodiment, the first bit set is used for generating a piece of UCI.

In one embodiment, the first bit block is used for generating a piece of UCI.

In one embodiment, the second signal is used for bearing a piece of UCI.

In one embodiment, the second signal is used for bearing K1 repetitions of transmission of a piece of UCI, K1 being a positive integer greater than 1.

In one embodiment, all information bits in UCI that the second time-domain resource set bears are transmitted in the second signal.

In one subembodiment, the first bit set comprises all information bits comprised in the UCI.

In one embodiment, partial information bits in UCI that the second time-domain resource set bears are transmitted in the second signal.

In one subembodiment, the first bit set comprises partial information bits comprised in the UCI.

In one embodiment, information bits comprised in the first bit set and information bits comprised in the first bit block are the same.

In one embodiment, information bits comprised in the first bit set are more than information bits comprised in the first bit block.

In one embodiment, of all information bits comprised in the first bit set there is at least one information bit not belonging to the first bit block.

In one embodiment, all information bits comprised in the first bit block belong to the first bit set.

In one embodiment, the second time-domain resource set comprises a third time-domain resource set and the target time-domain resource set, of which the third time-domain resource set is overlapping with the first time-domain resource set, and the target time-domain resource set is orthogonal with the first time-domain resource set.

In one embodiment, the K1 first-type time-domain resource subsets respectively correspond to K1 slots.

In one embodiment, the K1 first-type time-domain resource subsets respectively correspond to K1 mini-slots.

In one embodiment, the K1 first-type time-domain resource subsets respectively correspond to K1 sub-slots.

In one embodiment, any of the K1 first-type time-domain resource subsets occupies no more than 14 Orthogonal Frequency Division Multiplexing (OFDM) symbols.

In one embodiment, any of the K1 first-type time-domain resource subsets occupies fewer than 14 Orthogonal Frequency Division Multiplexing (OFDM) symbols.

In one embodiment, the phrase that "at least one second-type time-domain resource subset of the K1 second-type time-domain resource subsets is different from any of the K1 first-type time-domain resource subsets" means that at least one of the K1 second-type time-domain resource subsets occupies a different number of OFDM symbols from those occupied by any of the K1 first-type time-domain resource subsets.

In one embodiment, the phrase that "at least one second-type time-domain resource subset of the K1 second-type time-domain resource subsets is different from any of the K1 first-type time-domain resource subsets" means that any of the K1 second-type time-domain resource subsets occupies a different number of OFDM symbols from those occupied by any of the K1 first-type time-domain resource subsets.

Embodiment 2

Figure 2:
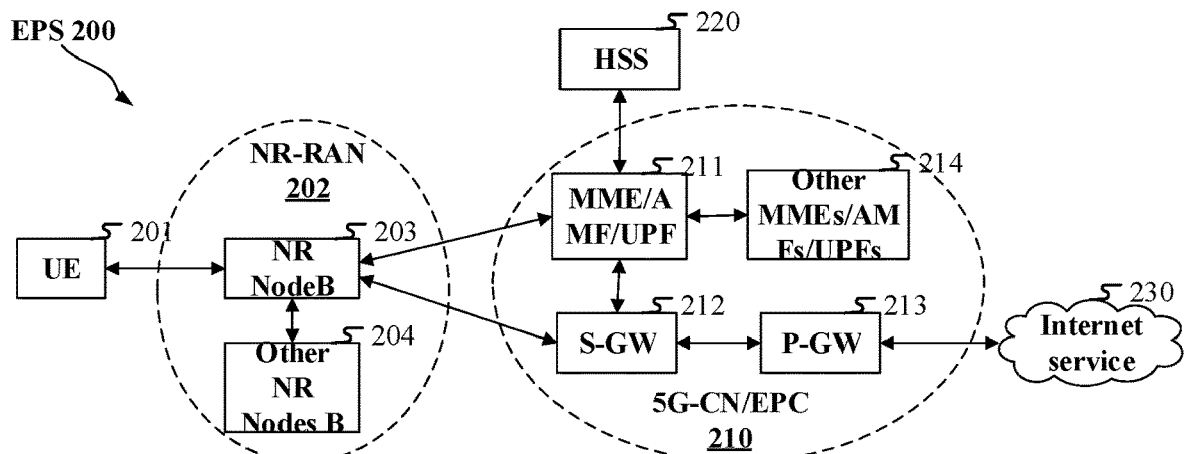
FIG. 2 illustrates a schematic diagram of a network architecture according to one embodiment of the present disclosure.

Embodiment 2 illustrates a schematic diagram of a network architecture, as shown in FIG. 2.

FIG. 2 is a diagram illustrating a network architecture 200 of 5G NR, Long-Term Evolution (LTE) and Long-Term Evolution Advanced (LTE-A) systems. The 5G NR or LTE network architecture 200 may be called an Evolved Packet System (EPS) 200 or other suitable terminology. The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services or other cellular networks. The NG-RAN 202 comprises an NR node B (gNB) 203 and other gNBs 204. The gNB 203 provides UE 201 oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrowband physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, a vehicle terminal, V2X equipment or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the UE 201 corresponds to the first node in the present disclosure.

In one embodiment, the UE 201 is a terminal with the capability of supporting traffics with varying delay requests.

In one embodiment, the UE 201 is a terminal supporting Enhanced Mobile Broadband (eMBB) and Ultra Reliable and Low Latency Communication (URLLC) traffics simultaneously.

In one embodiment, the UE 201 is a terminal supporting Inter-Slot PUCCH Repetition and Intra-Slot Repetition simultaneously.

In one embodiment, the UE 201 is a terminal supporting the adoption of Multi-TRP transmission mode in uplink.

In one embodiment, the gNB203 corresponds to the second node in the present disclosure.

In one embodiment, the gNB203 is a base station with the capability of supporting traffics with varying delay requests.

In one embodiment, the gNB203 is a base station supporting eMBB and URLLC traffics simultaneously.

In one embodiment, the gNB203 is a base station supporting Inter-Slot PUCCH Repetition and Intra-Slot Repetition simultaneously.

In one embodiment, the gNB203 is a base station supporting the adoption of Multi-TRP transmission mode in uplink.

Embodiment 3

Figure 3:
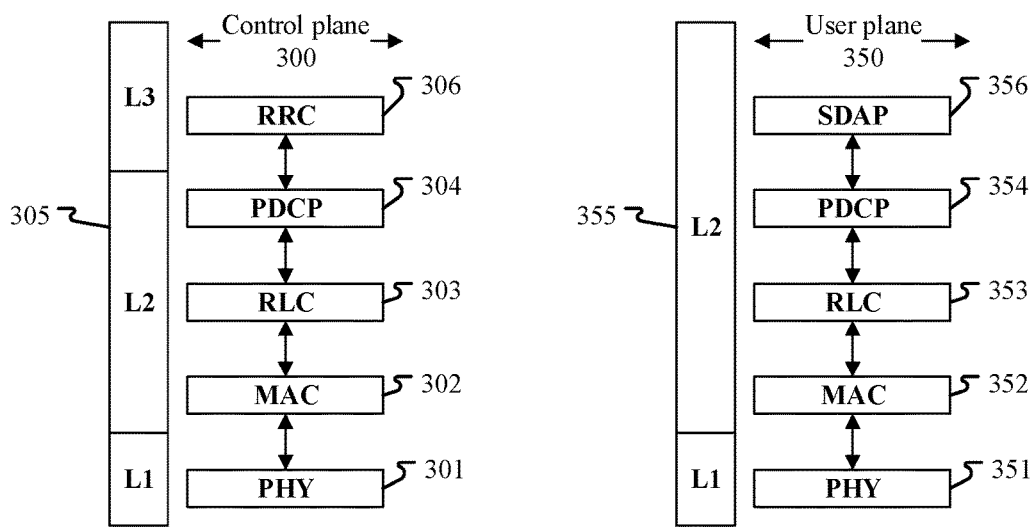
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane according to the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE, gNB or, RSU in V2X) and a second communication node (gNB, UE, or RSU in V2X), is represented by three layers, which are a layer 1, a layer 2 and a layer 3, respectively. The layer 1 (L1) is the lowest layer which performs signal processing functions of various PHY layers. The L1 is called PHY 301 in the present disclosure. The layer 2 (L2) 305 is above the PHY 301, and is in charge of the link between the first communication node and the second communication node or between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication nodes of the network side. The PDCP sublayer 304 provides multiplexing among variable radio bearers and logical channels. The PDCP sublayer 304 provides security by encrypting a packet and provides support for handover of a first communication node between second communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second communication node and the first communication node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first communication node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the PDCP304 of the second communication node is used for generating scheduling of the first communication node.

In one embodiment, the PDCP354 of the second communication node is used for generating scheduling of the first communication node.

In one embodiment, the first signaling in the present disclosure is generated by the PHY301 or the PHY351.

In one embodiment, the first signaling in the present disclosure is generated by the MAC302 or the MAC352.

In one embodiment, the first signaling in the present disclosure is generated by the RRC306.

In one embodiment, the second signaling in the present disclosure is generated by the PHY301 or the PHY351.

In one embodiment, the second signaling in the present disclosure is generated by the MAC302 or the MAC352.

In one embodiment, the second signaling in the present disclosure is generated by the RRC306.

In one embodiment, the first signal in the present disclosure is generated by the PHY301 or the PHY351.

In one embodiment, the first signal in the present disclosure is generated by the MAC302 or the MAC352.

In one embodiment, the first signal in the present disclosure is generated by the RRC306.

In one embodiment, the second signal in the present disclosure is generated by the PHY301 or the PHY351.

In one embodiment, the second signal in the present disclosure is generated by the MAC302 or the MAC352.

In one embodiment, the second signal in the present disclosure is generated by the RRC306.

In one embodiment, the third radio signal in the present disclosure is generated by the PHY301 or the PHY351.

In one embodiment, the third radio signal in the present disclosure is generated by the MAC302 or the MAC352.

In one embodiment, the third radio signal in the present disclosure is generated by the RRC306.

In one embodiment, the fourth radio signal in the present disclosure is generated by the PHY301 or the PHY351.

In one embodiment, the fourth radio signal in the present disclosure is generated by the MAC302 or the MAC352.

In one embodiment, the fourth radio signal in the present disclosure is generated by the RRC306.

In one embodiment, the first node is a terminal.

In one embodiment, the second node is a terminal.

In one embodiment, the second node is a Road Side Unit (RSU).

In one embodiment, the second node is a Grouphead.

In one embodiment, the second node is a Transmitter Receiver Point (TRP).

In one embodiment, the second node is a cell.

In one embodiment, the second node is an eNB.

In one embodiment, the second node is a base station.

In one embodiment, the second node is used for management over multiple base stations.

In one embodiment, the second node is a node for management over multiple cells.

In one embodiment, the second node is used for management over multiple TRPs.

Embodiment 4

Figure 4:
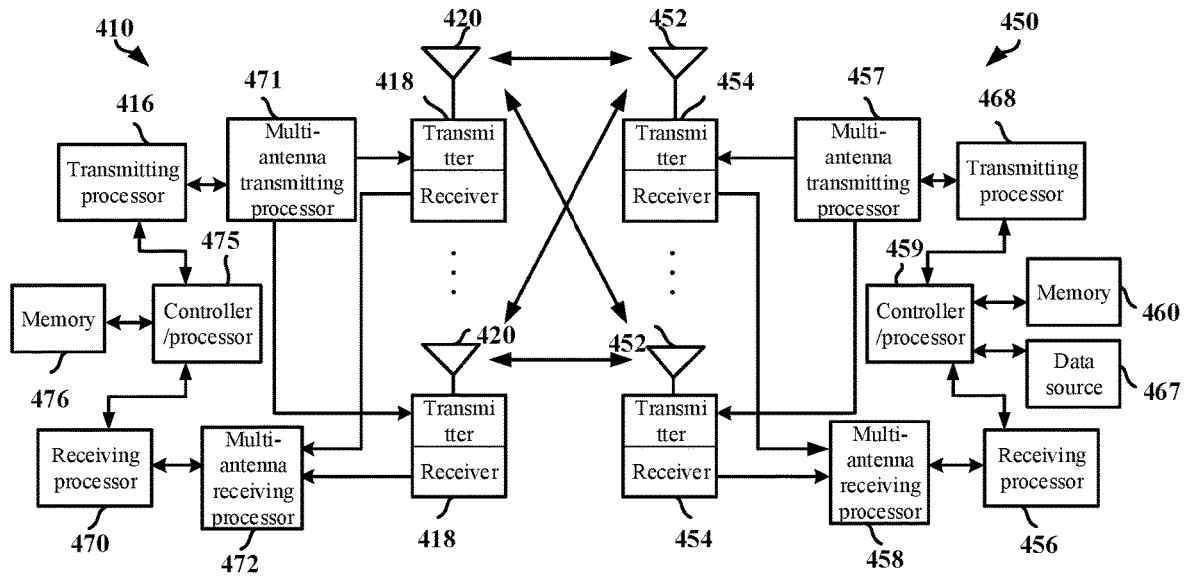
FIG. 4 illustrates a schematic diagram of a first communication device and a second communication device according to one embodiment of the present disclosure.

Embodiment 4 illustrates a schematic diagram of a first communication device and a second communication device according to the present disclosure, as shown in FIG. 4. FIG. 4 is a block diagram of a first communication device 450 and a second communication device 410 in communication with each other in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from a core network is provided to the controller/processor 475. The controller/processor 475 implements the functionality of the L2 layer. In the transmission from the second communication device 410 to the first communication device 450, the controller/processor 475 provides header compression, encryption, packet segmentation and reordering, multiplexing between a logical channel and a transport channel and radio resource allocation of the first communication device 450 based on various priorities. The controller/processor 475 is also in charge of a retransmission of a lost packet and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping of signal clusters corresponding to each modulation scheme (i.e., BPSK, QPSK, M-PSK, and M-QAM, etc.). The multi-antenna transmitting processor 471 performs digital spatial precoding, including codebook-based precoding and non-codebook-based precoding, and beamforming processing on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to antennas 420.

In a transmission from the second communication device 410 to the first communication device 450, at the first communication device 450, each receiver 454 receives a signal via a corresponding antenna 452. Each receiver 454 recovers information modulated onto the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any first communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410. Next, the higher-layer data and control signal are provided to the controller/processor 459. The controller/processor 459 performs functions of the L2 layer. The controller/processor 459 can be associated with a memory 460 that stores program code and data. The memory 460 can be called a computer readable medium. In the transmission from the second communication device 410 to the first communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the second communication device 410. The transmitting processor 468 performs modulation and mapping, as well as channel coding, and the multi-antenna transmitting processor 457 performs digital multi-antenna spatial precoding, including codebook-based precoding and non-codebook-based precoding, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decrypting, header decompression, control signal processing so as to recover a higher-layer packet from the first communication device (UE) 450. The higher-layer packet coming from the controller/processor 475 may be provided to the core network.

In one embodiment, the first communication device 450 comprises at least one processor and at least one memory. The at least one memory comprises computer program codes; the at least one memory and the computer program codes are configured to be used in collaboration with the at least one processor. The first communication device 450 at least receives a first signaling and a second signaling; the first signaling is used to determine a first time-domain resource set, and the second signaling is used to determine a second time-domain resource set; and transmits a first signal in the first time-domain resource set, and transmits a second signal in a target time-domain resource set; the first time-domain resource set is reserved for transmission of the first signal, and the second time-domain resource set is reserved for transmission of a first bit set, the first bit set comprising a first bit block, the first bit block being used to generate the second signal; the second time-domain resource set comprises K1 first-type time-domain resource subsets, K1 being a positive integer greater than 1; whether the first time-domain resource set is overlapping with the second time-domain resource set is used to determine whether the target time-domain resource set is comprised of the K1 first-type time-domain resource subsets or K1 second-type time-domain resource subsets; at least one second-type time-domain resource subset of the K1 second-type time-domain resource subsets is different from any of the K1 first-type time-domain resource sub sets.

In one embodiment, the first communication device 450 comprises a memory that stores a computer readable instruction program. The computer readable instruction program generates actions when executed by at least one processor. The actions include: receiving a first signaling and a second signaling; the first signaling is used to determine a first time-domain resource set, and the second signaling is used to determine a second time-domain resource set; and transmitting a first signal in the first time-domain resource set, and transmitting a second signal in a target time-domain resource set; the first time-domain resource set is reserved for transmission of the first signal, and the second time-domain resource set is reserved for transmission of a first bit set, the first bit set comprising a first bit block, the first bit block being used to generate the second signal; the second time-domain resource set comprises K1 first-type time-domain resource subsets, K1 being a positive integer greater than 1; whether the first time-domain resource set is overlapping with the second time-domain resource set is used to determine whether the target time-domain resource set is comprised of the K1 first-type time-domain resource subsets or K1 second-type time-domain resource subsets; at least one second-type time-domain resource subset of the K1 second-type time-domain resource subsets is different from any of the K1 first-type time-domain resource subsets.

In one embodiment, the second communication device 410 comprises at least one processor and at least one memory. The at least one memory comprises computer program codes. The at least one memory and the computer program codes are configured to be used in collaboration with the at least one processor. The second communication device 410 at least transmits a first signaling and a second signaling; the first signaling is used to determine a first time-domain resource set, and the second signaling is used to determine a second time-domain resource set; and receives a first signal in the first time-domain resource set, and receives a second signal in a target time-domain resource set; the first time-domain resource set is reserved for transmission of the first signal, and the second time-domain resource set is reserved for transmission of a first bit set, the first bit set comprising a first bit block, the first bit block being used to generate the second signal; the second time-domain resource set comprises K1 first-type time-domain resource subsets, K1 being a positive integer greater than 1; whether the first time-domain resource set is overlapping with the second time-domain resource set is used to determine whether the target time-domain resource set is comprised of the K1 first-type time-domain resource subsets or K1 second-type time-domain resource subsets; at least one second-type time-domain resource subset of the K1 second-type time-domain resource subsets is different from any of the K1 first-type time-domain resource sub sets.

In one embodiment, the second communication device 410 comprises a memory that stores a computer readable instruction program. The computer readable instruction program generates actions when executed by at least one processor. The actions include: transmitting a first signaling and a second signaling; the first signaling is used to determine a first time-domain resource set, and the second signaling is used to determine a second time-domain resource set; and receiving a first signal in the first time-domain resource set, and receiving a second signal in a target time-domain resource set; the first time-domain resource set is reserved for transmission of the first signal, and the second time-domain resource set is reserved for transmission of a first bit set, the first bit set comprising a first bit block, the first bit block being used to generate the second signal; the second time-domain resource set comprises K1 first-type time-domain resource subsets, K1 being a positive integer greater than 1; whether the first time-domain resource set is overlapping with the second time-domain resource set is used to determine whether the target time-domain resource set is comprised of the K1 first-type time-domain resource subsets or K1 second-type time-domain resource subsets; at least one second-type time-domain resource subset of the K1 second-type time-domain resource subsets is different from any of the K1 first-type time-domain resource sub sets.

In one embodiment, the first communication device 450 corresponds to the first node in the present disclosure.

In one embodiment, the second communication device 410 corresponds to the second node in the present disclosure.

In one embodiment, the first communication device 450 is a UE.

In one embodiment, the first communication device 450 is a terminal.

In one embodiment, the second communication device 410 is a base station.

In one embodiment, the second communication device 410 is a UE.

In one embodiment, the second communication device 410 is network equipment.

In one embodiment, the second communication device 410 is a serving cell.

In one embodiment, the second communication device 410 is a TRP.

In one embodiment, at least the first four of the antenna 452, the receiver 454, the multi-antenna receiving processor 458, the receiving processor 456, and the controller/processor 459 are used for receiving a first signaling and a second signaling; at least the first four of the antenna 420, the transmitter 418, the multi-antenna transmitting processor 471, the transmitting processor 416 and the controller/processor 475 are used for transmitting a first signaling and a second signaling.

In one embodiment, at least the first four of the antenna 452, the transmitter 454, the multi-antenna transmitting processor 457, the transmitting processor 468, and the controller/processor 459 are used for transmitting a first signal in the first time-domain resource set, and transmitting a second signal in the target time-domain resource set; at least the first four of the antenna 420, the receiver 418, the multi-antenna receiving processor 472, the receiving processor 470 and the controller/processor 475 are used for receiving a first signal in the first time-domain resource set, and receiving a second signal in the target time-domain resource set.

In one embodiment, at least the first four of the antenna 452, the receiver 454, the multi-antenna receiving processor 458, the receiving processor 456, and the controller/processor 459 are used for receiving a third radio signal and a fourth radio signal; at least the first four of the antenna 420, the transmitter 418, the multi-antenna transmitting processor 471, the transmitting processor 416 and the controller/processor 475 are used for transmitting a third radio signal and a fourth radio signal.

Embodiment 5

Figure 5:
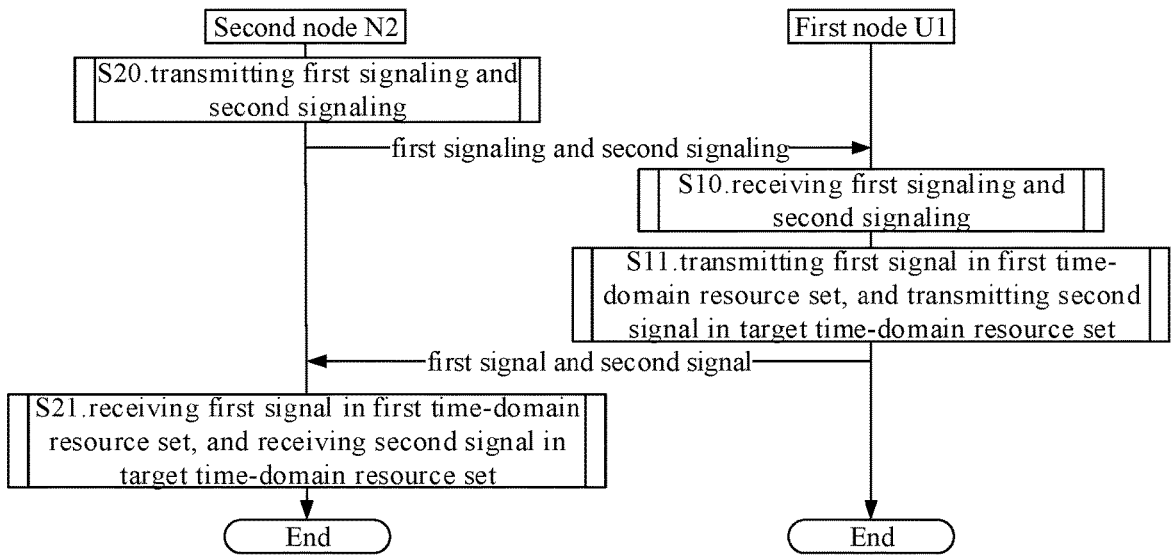
FIG. 5 illustrates a flowchart of a first signaling and a second signaling according to one embodiment of the present disclosure.

Embodiment 5 illustrates a flowchart of a first signaling and a second signaling, as shown in FIG. 5. In FIG. 5, a first node U1 and a second node N2 are in communications via a radio link. It should be particularly noted that the sequence illustrated in this figure does not set any limit on the order of signal transmissions and implementations in the present disclosure.

The first node U1 receives a first signaling and a second signaling in step S10; transmits a first signal in a first time-domain resource set and transmits a second signal in a target time-domain resource set in step S11.

The second node N2 transmits a first signaling and a second signaling in step S20; receives a first signal in a first time-domain resource set and receives a second signal in a target time-domain resource set in step S21.

In Embodiment 5, the first signaling is used to determine a first time-domain resource set, and the second signaling is used to determine a second time-domain resource set; the first time-domain resource set is reserved for transmission of the first signal, and the second time-domain resource set is reserved for transmission of a first bit set, the first bit set comprising a first bit block, the first bit block being used to generate the second signal; the second time-domain resource set comprises K1 first-type time-domain resource subsets, K1 being a positive integer greater than 1; whether the first time-domain resource set is overlapping with the second time-domain resource set is used to determine whether the target time-domain resource set is comprised of the K1 first-type time-domain resource subsets or K1 second-type time-domain resource subsets; at least one second-type time-domain resource subset of the K1 second-type time-domain resource subsets is different from any of the K1 first-type time-domain resource subsets.

In one embodiment, when the first time-domain resource set and the second time-domain resource set are orthogonal, the target time-domain resource set is comprised of the K1 first-type time-domain resource subsets; when the first time-domain resource set and the second time-domain resource set are overlapping, the target time-domain resource set is comprised of the K1 second-type time-domain resource subsets.

In one subembodiment, when the first time-domain resource set and the second time-domain resource set are orthogonal, the target time-domain resource set is the K1 first-type time-domain resource subsets.

In one subembodiment, when the first time-domain resource set and the second time-domain resource set are overlapping, the target time-domain resource set is the K1 second-type time-domain resource subsets.

In one subembodiment, the phrase that "the first time-domain resource set and the second time-domain resource set are orthogonal" includes a meaning that there isn't an OFDM symbol that belongs to both a time-domain resource occupied by the first time-domain resource set and a time-domain resource occupied by the second time-domain resource set.

In one subembodiment, the phrase that "the first time-domain resource set and the second time-domain resource set are overlapping" includes a meaning that there is at least one OFDM symbol that belongs to both a time-domain resource occupied by the first time-domain resource set and a time-domain resource occupied by the second time-domain resource set.

In one subembodiment, the phrase that "the first time-domain resource set and the second time-domain resource set are overlapping" includes a meaning that there is at least one OFDM symbol that belongs to either a time-domain resource occupied by the first time-domain resource set or a time-domain resource occupied by the second time-domain resource set.

In one subembodiment, the phrase that "the first time-domain resource set and the second time-domain resource set are overlapping" includes a meaning that a time-domain resource occupied by the first time-domain resource set and a time-domain resource occupied by the second time-domain resource set do not coincide.

In one subembodiment, the K1 second-type time-domain resource subsets respectively correspond to K1 mini-slots.

In one subembodiment, the K1 second-type time-domain resource subsets respectively correspond to K1 sub-slots.

In one subembodiment, the K1 second-type time-domain resource subsets respectively correspond to K1 OFDM symbols.

In one subembodiment, any of the K1 second-type time-domain resource subsets occupies fewer than 14 OFDM symbols.

In one embodiment, when the first time-domain resource set and the second time-domain resource set are overlapping, the second time-domain resource set comprises a third time-domain resource set and the target time-domain resource set, the third time-domain resource set comprises K3 first-type time-domain resource subset(s) of the K1 first-type time-domain resource subsets, and the target time-domain resource set comprises K2 first-type time-domain resource subset(s) of the K1 first-type time-domain resource subsets, where both K2 and K3 are positive integers less than K1, and a sum of the K2 and K3 equals K1.

In one subembodiment, the first node U1 drops transmitting information bits comprised in the first bit set in the third time-domain resource set.

In one subembodiment, the first node U1 only transmits information bits comprised in the first bit block in the target time-domain resource set.

In one subembodiment, K2 is greater than 1.

In one subembodiment, K3 is equal to 1.

In one subembodiment, K3 is greater than 1.

In one embodiment, when the first time-domain resource set and the second time-domain resource set are overlapping, the first bit block is used to generate K1 second-type radio sub-signals, and the second radio signal comprises the K1 second-type radio sub-signals, the K1 second-type radio sub-signals being transmitted respectively in the K1 second-type time-domain resource subsets in time domain.

In one subembodiment, there is at least one information bit in the first bit set that does not belong to the first bit block.

In one subembodiment, the K1 second-type radio sub-signals are respectively K1 repetitions of transmission of a piece of UCI.

In one subembodiment, the K1 second-type radio sub-signals are respectively K1 PUCCHs.

In one subembodiment, the K1 second-type radio sub-signals are respectively K1 repetitions of transmission of a PUCCH.

In one subembodiment, the first bit block comprises all information bits in the first bit set.

In one subembodiment, the first bit block comprises partial information bits in the first bit set.

In one subembodiment, the first bit block only comprises information bit(s) used for Hybrid Automatic Repeat reQuest Acknowledgement (HARQ-ACK) feedback.

In one subembodiment, the first bit set comprises information bit(s) used for HARQ-ACK feedback, and the first bit set comprises information bits in at least one of Channel Quality Information (CQI), a Precoding Matrix Indicator (PMI), a CSI-RS Resource Indicator (CRI), an SS/PBCH Resource Block Indicator (SSBRI), a Layer Indicator (LI), a Rank Indicator (RI), a Precoding Type Indicator (PTI), a Reference Signal Received Power (RSRP), a Reference Signal Received Quality (RSRQ) or a Signal-to-noise and interference ratio (SINR).

In one embodiment, the second signaling is used to indicate a first PUCCH resource, a time-domain resource occupied by the first PUCCH resource is comprised of the K1 first-type time-domain resource subsets, and the first PUCCH resource adopts a first PUCCH format; the second signal is transmitted in a second PUCCH resource, a time-domain resource occupied by the second PUCCH resource is comprised of the K1 second-type time-domain resource subsets, and the second PUCCH resource adopts a second PUCCH format, the first PUCCH format being different from the second PUCCH format.

In one subembodiment, the first PUCCH resource is a PUCCH Resource.

In one subembodiment, the second PUCCH resource is a PUCCH Resource.

In one subembodiment, when the first time-domain resource set and the second time-domain resource set are orthogonal, the second signaling is used to indicate the first PUCCH resource in a first PUCCH resource set, the first PUCCH resource set being configured by an RRC signaling.

In one subembodiment, when the first time-domain resource set and the second time-domain resource set are overlapping, the second signaling is used to indicate the second PUCCH resource in a second PUCCH resource set, the second PUCCH resource set being configured by an RRC signaling.

In one subsidiary embodiment of the above subembodiment, the first node U1 determines the first PUCCH resource set according to a payload occupied by the first bit set.

In one subsidiary embodiment of the above subembodiment, the first node U1 determines the second PUCCH resource set according to a payload occupied by the first bit block.

In one subsidiary embodiment of the above subembodiment, the first node U1 determines a payload occupied by the first bit block according to a number of symbols occupied by the target time-domain resource set in time domain.

In one subembodiment, the first PUCCH format is one of PUCCH Format 1, PUCCH Format 3 or PUCCH Format 4.

In one subembodiment, the second PUCCH format is one of PUCCH Format 0 or PUCCH Format 2.

In one subembodiment, a number of information bits that can be carried by the first PUCCH format is no less than a number of information bits that can be carried by the second PUCCH format.

In one subembodiment, a number of information bits that can be carried by the first PUCCH format is greater than a number of information bits that can be carried by the second PUCCH format.

In one embodiment, the second signaling is used to indicate a first PUCCH resource, and a time-domain resource occupied by the first PUCCH resource is comprised of the K1 first-type time-domain resource subsets; the second signal is transmitted in a second PUCCH resource, and a time-domain resource occupied by the second PUCCH resource is comprised of the K1 second-type time-domain resource subsets; the first PUCCH resource and the second PUCCH resource occupy equal numbers of resource blocks (RBs) in frequency domain.

In one subembodiment, the RB occupies 12 consecutive subcarriers in frequency domain.

In one subembodiment, the first PUCCH resource comprises K1 first-type PUCCH sub-resources, and the K1 first-type PUCCH sub-resources are respectively located in the K1 first-type time-domain resource subsets, the second signaling is used to indicate a frequency-domain position of a first-type PUCCH sub-resource out of the K1 first-type PUCCH sub-resources that is in an earliest first-type time-domain resource subset among the K1 first-type time-domain resource subsets.

In one subembodiment, the first PUCCH resource comprises K1 first-type PUCCH sub-resources, and the K1 first-type PUCCH sub-resources are respectively located in the K1 first-type time-domain resource subsets, the second signaling is used to indicate a frequency-domain position of any first-type PUCCH sub-resource of the K1 first-type PUCCH sub-resources, the K1 first-type PUCCH sub-resources each occupying a same frequency-domain resource.

In one subembodiment, the phrase that "the first PUCCH resource and the second PUCCH resource occupy equal numbers of resource blocks in frequency domain" means that the first PUCCH resource and the second PUCCH resource occupy equal numbers of RBs in a time unit.

In one subsidiary embodiment of the above subembodiment, the time unit is one of slot, mini-slot, sub-slot or OFDM symbol.

In one subembodiment, the phrase that "the first PUCCH resource and the second PUCCH resource occupy equal numbers of resource blocks in frequency domain" means that the first PUCCH resource comprises K1 first-type PUCCH sub-resources, and the second PUCCH resource comprises K1 second-type PUCCH sub-resources, a given first-type PUCCH sub-resource is one of the K1 first-type PUCCH sub-resources and is overlapping with a given second-type PUCCH sub-resource of the K1 second-type PUCCH sub-resources in time domain, the given first-type PUCCH sub-resource and the given second-type PUCCH sub-resource occupying equal numbers of RBs in frequency domain.

In one subembodiment, the phrase that "the first PUCCH resource and the second PUCCH resource occupy equal numbers of resource blocks in frequency domain" means that the first PUCCH resource comprises K1 first-type PUCCH sub-resources, and the second PUCCH resource comprises K1 second-type PUCCH sub-resources, a given first-type PUCCH sub-resource is one of the K1 first-type PUCCH sub-resources and is overlapping with a given second-type PUCCH sub-resource of the K1 second-type PUCCH sub-resources in time domain, the given first-type PUCCH sub-resource and the given second-type PUCCH sub-resource occupying Q1 RB(s) in a same frequency-domain position, Q1 being a positive integer.

In one embodiment, of the K1 first-type time-domain resource subsets there is at least one first-type time-domain resource subset occupying a larger number of OFDM symbols than any second-type time-domain resource subset of the K1 second-type time-domain resource sub sets.

Embodiment 6

Figure 6:
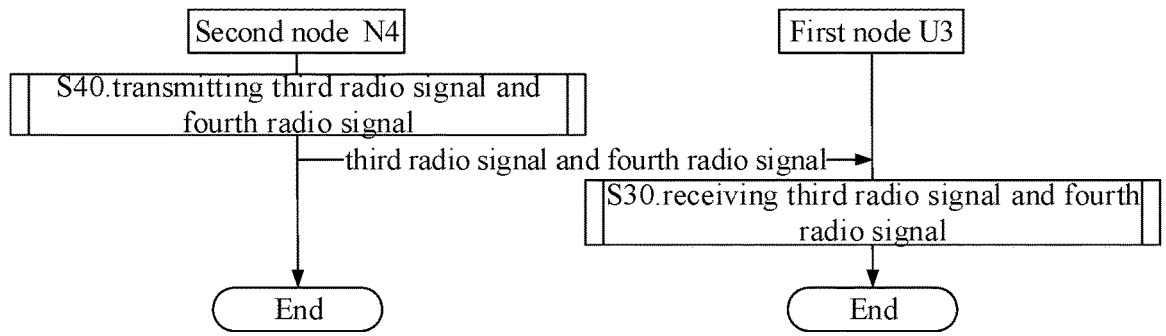
FIG. 6 illustrates a flowchart of a third radio signal and a fourth radio signal according to one embodiment of the present disclosure.

Embodiment 6 illustrates a flowchart of a third radio signal and a fourth radio signal, as shown in FIG. 6. In FIG. 6, a first node U3 and a second node N4 are in communications via a radio link. It should be particularly noted that the sequence illustrated in this figure does not set any limit on the order of signal transmissions and implementations in the present disclosure.

The first node U3 receives a third radio signal and a fourth radio signal in step S30.

The second node N4 transmits a third radio signal and a fourth radio signal in step S40.

In Embodiment 6, the first signaling comprises configuration information of the third radio signal, and the second signaling comprises configuration information of the fourth radio signal, the first signal comprises feedback for the third radio signal, and the second signal comprises feedback for the fourth radio signal.

In one embodiment, the step S30 is taken after the step S10 and before the step S11 in Embodiment 5.

In one embodiment, the step S40 is taken after the step S20 and before the step S21 in Embodiment 5.

In one embodiment, a physical layer channel bearing the third radio signal comprises a Physical Downlink Shared Channel (PDSCH).

In one embodiment, a physical layer channel bearing the fourth radio signal comprises a PDSCH.

In one embodiment, the third radio signal comprises a Channel State Information Reference Signal (CSI-RS).

In one embodiment, the fourth radio signal comprises a CSI-RS.

In one embodiment, the first signaling is used to schedule the third radio signal.

In one embodiment, the second signaling is used to schedule the fourth radio signal.

In one embodiment, the first signaling is used to indicate a time-domain resource occupied by the third radio signal.

In one embodiment, the first signaling is used to indicate a frequency-domain resource occupied by the third radio signal.

In one embodiment, the first signaling is used to indicate a Redundancy Version (RV) employed by the third radio signal.

In one embodiment, the first signaling is used to indicate a HARQ Process Number employed by the third radio signal.

In one embodiment, the first signaling is used to indicate a Modulation and Coding Scheme (MCS) employed by the third radio signal.

In one embodiment, the first node U3 determine a position of a time-domain resource occupied by the first time-domain resource set according to a position of a time-domain resource occupied by the third radio signal and indication by the first signaling.

In one embodiment, the second signaling is used to indicate a time-domain resource occupied by the fourth radio signal.

In one embodiment, the second signaling is used to indicate a frequency-domain resource occupied by the fourth radio signal.

In one embodiment, the second signaling is used to indicate a Redundancy Version (RV) employed by the fourth radio signal.

In one embodiment, the second signaling is used to indicate a HARQ Process Number employed by the fourth radio signal.

In one embodiment, the second signaling is used to indicate a Modulation and Coding Scheme (MCS) employed by the fourth radio signal.

In one embodiment, the first node U3 determine a position of a time-domain resource occupied by the second time-domain resource set according to a position of a time-domain resource occupied by the fourth radio signal and indication by the second signaling.

In one embodiment, the first signal is used to indicate whether the third radio signal is correctly received.

In one embodiment, the first signal comprises a HARQ-ACK of the third radio signal.

In one embodiment, the first signal comprises a HARQ-ACK associated with the first signaling.

In one embodiment, the first signal comprises CSI acquired by receiving the third radio signal.

In one embodiment, the first signal comprises at least one of a RSRP, a RSRQ or a SINR acquired by receiving the third radio signal.

In one embodiment, the first signal is used to indicate whether the third radio signal is correctly received.

In one embodiment, the first signal comprises a HARQ-ACK of the third radio signal.

In one embodiment, the first signal comprises a HARQ-ACK associated with the first signaling.

In one embodiment, the first signal comprises CSI acquired by receiving the third radio signal.

In one embodiment, the second signal is used to indicate whether the fourth radio signal is correctly received.

In one embodiment, the second signal comprises a HARQ-ACK of the fourth radio signal.

In one embodiment, the second signal comprises a HARQ-ACK associated with the second signaling.

In one embodiment, the second signal comprises CSI acquired by receiving the fourth radio signal.

In one embodiment, the second signal comprises at least one of a RSRP, a RSRQ or a SINR acquired by receiving the fourth radio signal.

In one embodiment, the second signal is used to indicate whether the fourth radio signal is correctly received.

In one embodiment, the second signal comprises a HARQ-ACK of the fourth radio signal.

In one embodiment, the second signal comprises a HARQ-ACK associated with the second signaling.

In one embodiment, the second signal comprises CSI acquired by receiving the fourth radio signal.

Embodiment 7

Figure 7:
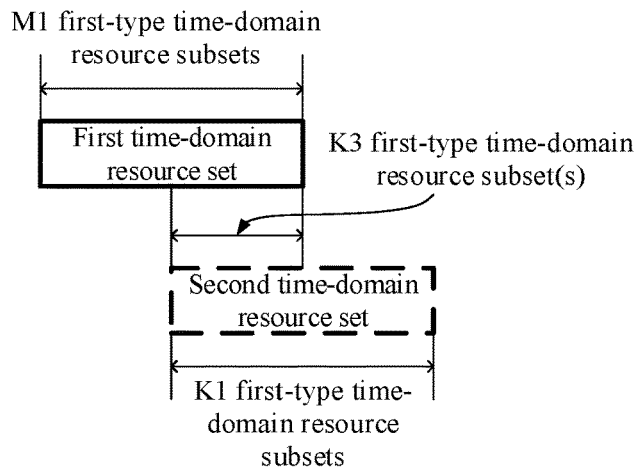
FIG. 7 illustrates a schematic diagram of a first time-domain resource set and a second time-domain resource set according to one embodiment of the present disclosure.

Embodiment 7 illustrates a schematic diagram of a first time-domain resource set and a second time-domain resource set, as shown in FIG. 7. In FIG. 7, the first time-domain resource set comprises M1 first-type time-domain resource subsets, and the second time-domain resource set comprises K1 first-type time-domain resource subsets, the M1 first-type time-domain resource subsets are overlapping with K3 first-type time-domain resource subset(s) of the K1 first-type time-domain resource subsets, where M1 and K1 are both positive integers greater than 1, and K3 is a positive integer.

In one embodiment, the M1 first-type time-domain resource subsets are contiguous in time domain.

In one embodiment, there are at least two time-domain adjacent first-type time-domain resource subsets among the M1 first-type time-domain resource subsets that are non-contiguous in time domain.

In one embodiment, the K1 first-type time-domain resource subsets are contiguous in time domain.

In one embodiment, there are at least two time-domain adjacent first-type time-domain resource subsets among the K1 first-type time-domain resource subsets that are non-contiguous in time domain.

In one embodiment, any two first-type time-domain resource subsets of the M1 first-type time-domain resource subsets have a same duration in time domain.

In one embodiment, at least two first-type time-domain resource subsets of the M1 first-type time-domain resource subsets have different durations in time domain.

In one embodiment, any two first-type time-domain resource subsets of the K1 first-type time-domain resource subsets have a same duration in time domain.

In one embodiment, at least two first-type time-domain resource subsets of the K1 first-type time-domain resource subsets have different durations in time domain.

In one embodiment, the first-type time-domain resource subset is one of a slot, a mini-slot or a sub-slot.

Embodiment 8

Figure 8:
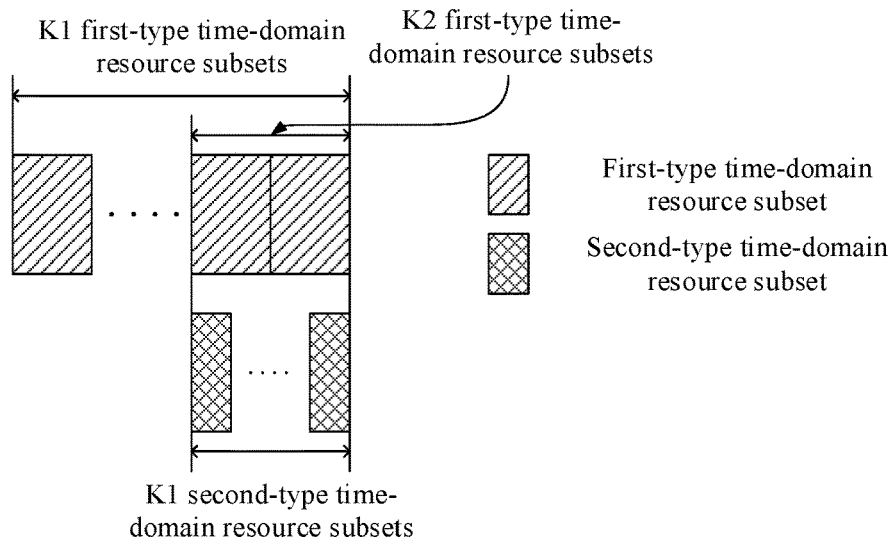
FIG. 8 illustrates a schematic diagram of K1 first-type time-domain resource subsets and K1 second-type time-domain resource subsets according to one embodiment of the present disclosure.

Embodiment 8 illustrates a schematic diagram of K1 first-type time-domain resource subsets and K1 second-type time-domain resource subsets, as shown in FIG. 8. In FIG. 8, the K1 second-type time-domain resource subsets occupy K2 first-type time-domain resource subsets out of the K1 first-type time-domain resource subsets, K2 being a positive integer less than K1.

In one embodiment, a duration that the first-type time-domain resource subset lasts is longer than a duration that the second-type time-domain resource subset lasts in time domain.

In one embodiment, the K1 second-type time-domain resource subsets are contiguous in time domain.

In one embodiment, there are at least two time-domain adjacent second-type time-domain resource subsets among the K1 second-type time-domain resource subsets that are non-contiguous in time domain.

In one embodiment, any of the K1 first-type time-domain resource subsets occupies X1 consecutive OFDM symbols, where X1 is equal to 7 or 14.

In one embodiment, any of the K1 second-type time-domain resource subsets occupies X2 consecutive OFDM symbols, where X2 is equal to 1, 2, 4 or 7.

Embodiment 9

Figure 9:
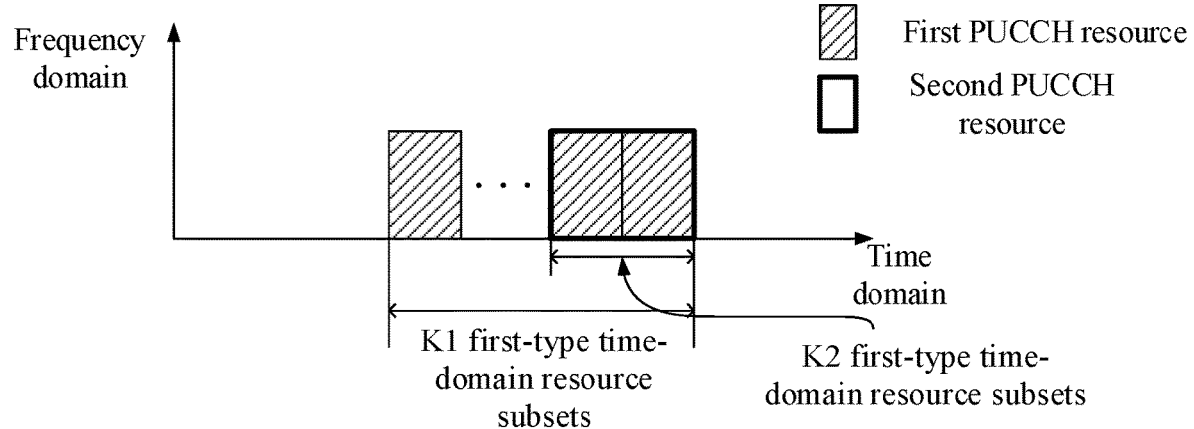
FIG. 9 illustrates a schematic diagram of a first PUCCH resource and a second PUCCH resource according to one embodiment of the present disclosure.

Embodiment 9 illustrates a schematic diagram of a first PUCCH resource and a second PUCCH resource, as shown in FIG. 9. In FIG. 9, the first PUCCH resource occupies K1 first-type time-domain resource subsets in time domain, and the first PUCCH resource occupies a first RB set in each of the K1 first-type time-domain resource subsets; the second PUCCH resource occupies K1 second-type time-domain resource subsets in time domain, and the second PUCCH resource occupies the first RB set in each of K2 first-type time-domain resource subsets. Time domain resources occupied by the K2 first-type time-domain resource subsets and time domain resources occupied by the K1 second-type time-domain resource subsets are the same.

In one embodiment, the first RB set only comprises one RB.

In one embodiment, the first RB set comprises multiple RBs.

In one embodiment, any RB in the first RB set in the present disclosure occupies 12 contiguous subcarriers.

Embodiment 10

Figure 10:
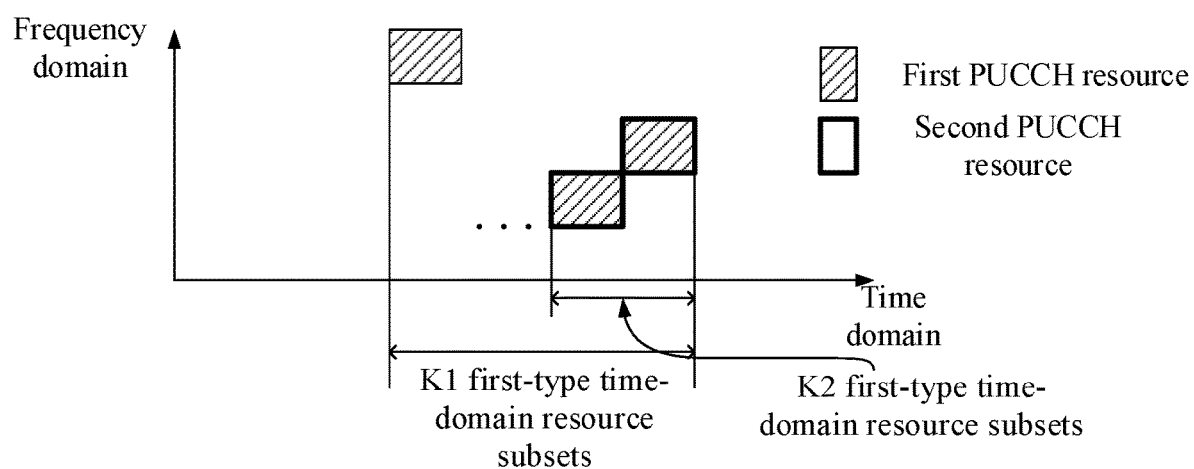
FIG. 10 illustrates a schematic diagram of a first PUCCH resource and a second PUCCH resource according to another embodiment of the present disclosure.

Embodiment 10 illustrates another schematic diagram of a first PUCCH resource and a second PUCCH resource, as shown in FIG. 10. In FIG. 10, the first PUCCH resource occupies K1 first-type time-domain resource subsets in time domain, and RBs occupied by the first PUCCH resource in each of the K1 first-type time-domain resource subsets are frequency hopping; the second PUCCH resource occupies K1 second-type time-domain resource subsets in time domain, and a frequency-domain resource occupied by the second PUCCH resource in K2 first-type time-domain resource subsets and a frequency-domain resource occupied by the first PUCCH resource in the K1 first-type time-domain resource subsets are overlapping. Time domain resources occupied by the K2 first-type time-domain resource subsets and time domain resources occupied by the K1 second-type time-domain resource subsets are the same.

In one embodiment, the first PUCCH resource occupies a positive integer number of RBs in frequency domain, and any of the RBs occupies 12 contiguous subcarriers in frequency domain.

In one embodiment, the second PUCCH resource occupies a positive integer number of RBs in frequency domain, and any of the RBs occupies 12 contiguous subcarriers in frequency domain.

Embodiment 11

Figure 11:
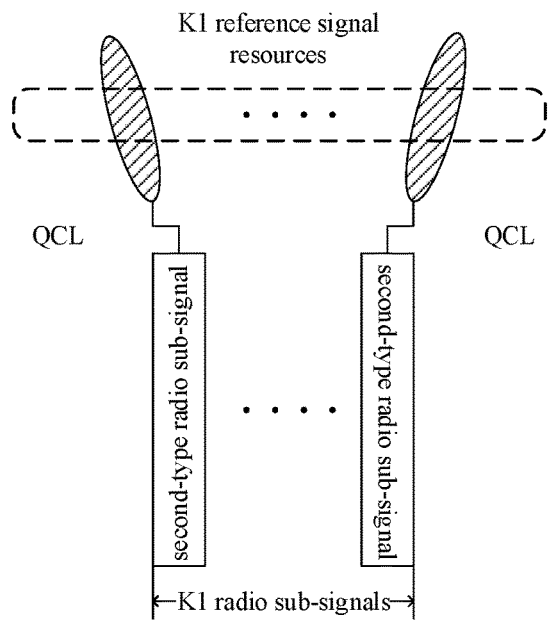
FIG. 11 illustrates a schematic diagram of transmission of a second signal according to one embodiment of the present disclosure.

Embodiment 11 illustrates a schematic diagram of transmission of a second signal, as shown in FIG. 11. In FIG. 11, the second signal in the present disclosure comprises K1 second-type radio sub-signals, and the K1 second-type radio sub-signals are respectively transmitted by the first node in the K1 second-type time-domain resource subsets; the K1 second-type radio sub-signals are respectively Quasi Co-located (QCL) with K1 reference signal resources.

In one embodiment, there is at least one reference signal resource of the K1 reference signal resources that comprises at least one of a Channel State Information-Reference Signal (CSI-RS) or a Synchronization Signal/physical broadcast channel Block (SSB).

In one embodiment, there are at least two of the K1 reference signal resources being non-QCL.

In one embodiment, there are at least two of the K1 reference signal resources corresponding to two different beamforming vectors respectively.

In one embodiment, the K1 second-type radio sub-signals are received by the second node in the present disclosure through multiple TRPs.

In one embodiment, the K1 second-type radio sub-signals are received by the second node in the present disclosure through 2 TRPs.

In one subsidiary embodiment of the above embodiment, the K1 second-type radio sub-signals are alternately associated with two reference signal resources, the two reference signal resources being non-QCL.

Embodiment 12

Figure 12:
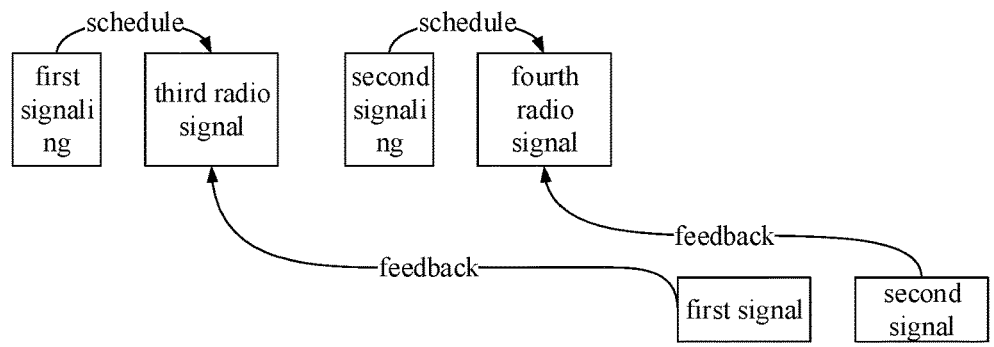
FIG. 12 illustrates a schematic diagram of a temporal relation between a third radio signal and a fourth radio signal according to one embodiment of the present disclosure.

Embodiment 12 illustrates a schematic diagram of a temporal relation between a third radio signal and a fourth radio signal, as shown in FIG. 12. In FIG. 12, the first signaling is used to indicate a time-domain resource occupied by the third radio signal, and the second signaling is used to indicate a time-domain resource occupied by the fourth radio signal; the first signaling is used for feedback of the third radio signal, and the second signal is used for feedback of the fourth radio signal; the fourth radio signal is transmitted upon transmission of the third radio signal.

In one embodiment, the first signaling is used to schedule the third radio signal.

In one embodiment, the second signaling is used to schedule the fourth radio signal.

In one embodiment, the first signal comprises a HARQ-ACK of the third radio signal.

In one embodiment, the second signal comprises a HARQ-ACK of the fourth radio signal.

Embodiment 13

Figure 13:
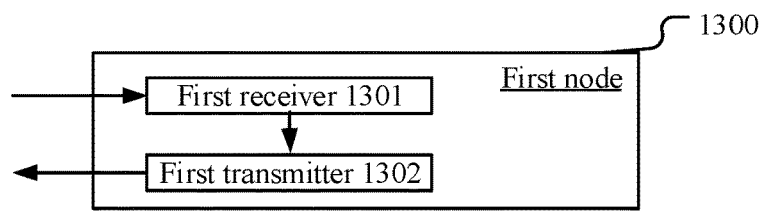
FIG. 13 illustrates a structure block diagram of a processing device in a first node according to one embodiment of the present disclosure.

Embodiment 13 illustrates a structure block diagram of a processing device in a first node, as shown in FIG. 13. In FIG. 13, a first node 1300 comprises a first receiver 1301 and a first transmitter 1302.

The first receiver 1301 receives a first signaling and a second signaling; the first signaling is used to determine a first time-domain resource set, and the second signaling is used to determine a second time-domain resource set.

The first transmitter 1302 transmits a first signal in a first time-domain resource set and transmits a second signal in a target time-domain resource set.

In Embodiment 13, the first time-domain resource set is reserved for transmission of the first signal, and the second time-domain resource set is reserved for transmission of a first bit set, the first bit set comprising a first bit block, the first bit block being used to generate the second signal; the second time-domain resource set comprises K1 first-type time-domain resource subsets, K1 being a positive integer greater than 1; whether the first time-domain resource set is overlapping with the second time-domain resource set is used to determine whether the target time-domain resource set is comprised of the K1 first-type time-domain resource subsets or K1 second-type time-domain resource subsets; at least one second-type time-domain resource subset of the K1 second-type time-domain resource subsets is different from any of the K1 first-type time-domain resource subsets.

In one embodiment, when the first time-domain resource set and the second time-domain resource set are orthogonal, the target time-domain resource set is comprised of the K1 first-type time-domain resource subsets; when the first time-domain resource set and the second time-domain resource set are overlapping, the target time-domain resource set is comprised of the K1 second-type time-domain resource subsets.

In one embodiment, when the first time-domain resource set and the second time-domain resource set are overlapping, the second time-domain resource set comprises a third time-domain resource set and the target time-domain resource set, the third time-domain resource set comprises K3 first-type time-domain resource subset(s) of the K1 first-type time-domain resource subsets, and the target time-domain resource set comprises K2 first-type time-domain resource subset(s) of the K1 first-type time-domain resource subsets, where both K2 and K3 are positive integers less than K1, and a sum of the K2 and K3 equals K1.

In one embodiment, when the first time-domain resource set and the second time-domain resource set are overlapping, the first bit block is used to generate K1 second-type radio sub-signals, and the second radio signal comprises the K1 second-type radio sub-signals, the K1 second-type radio sub-signals being transmitted respectively in the K1 second-type time-domain resource subsets in time domain.

In one embodiment, the second signaling is used to indicate a first PUCCH resource, a time-domain resource occupied by the first PUCCH resource is comprised of the K1 first-type time-domain resource subsets, and the first PUCCH resource adopts a first PUCCH format; the second signal is transmitted in a second PUCCH resource, a time-domain resource occupied by the second PUCCH resource is comprised of the K1 second-type time-domain resource subsets, and the second PUCCH resource adopts a second PUCCH format, the first PUCCH format being different from the second PUCCH format.

In one embodiment, the second signaling is used to indicate a first PUCCH resource, and a time-domain resource occupied by the first PUCCH resource is comprised of the K1 first-type time-domain resource subsets; the second signal is transmitted in a second PUCCH resource, and a time-domain resource occupied by the second PUCCH resource is comprised of the K1 second-type time-domain resource subsets; the first PUCCH resource and the second PUCCH resource occupy equal numbers of resource blocks (RBs) in frequency domain.

In one embodiment, of the K1 first-type time-domain resource subsets there is at least one first-type time-domain resource subset occupying a larger number of OFDM symbols than any second-type time-domain resource subset of the K1 second-type time-domain resource subsets.

In one embodiment, the first receiver 1301 receives a third radio signal, and the first receiver 1301 receives a fourth radio signal; the first signaling comprises configuration information of the third radio signal, and the second signaling comprises configuration information of the fourth radio signal, the first signal comprises feedback for the third radio signal, and the second signal comprises feedback for the fourth radio signal.

In one embodiment, the first receiver 1301 comprises at least the first four of the antenna 452, the receiver 454, the multi-antenna receiving processor 458, the receiving processor 456 and the controller/processor 459 in Embodiment 4.

In one embodiment, the first transmitter 1302 comprises at least the first four of the antenna 452, the transmitter 454, the multi-antenna transmitting processor 457, the transmitting processor 468 and the controller/processor 459 in Embodiment 4.

Embodiment 14

Figure 14:
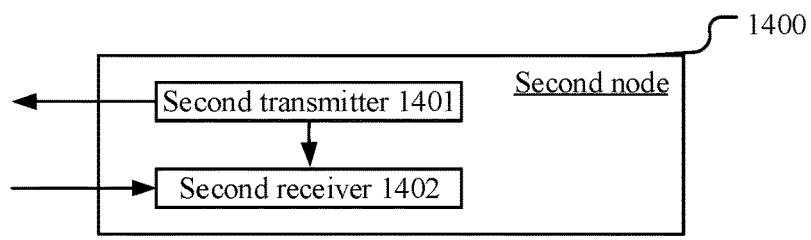
FIG. 14 illustrates a structure block diagram a processing device in a second node according to one embodiment of the present disclosure.

Embodiment 14 illustrates a structure block diagram of a processing device in a second node, as shown in FIG. 14. In FIG. 14, a second node 1400 comprises a second transmitter 1401 and a second receiver 1402.

The second transmitter 1401 transmits a first signaling and a second signaling; the first signaling is used to determine a first time-domain resource set, and the second signaling is used to determine a second time-domain resource set.

The second receiver 1402 receives a first signal in a first time-domain resource set and receives a second signal in a target time-domain resource set.

In Embodiment 14, the first time-domain resource set is reserved for transmission of the first signal, and the second time-domain resource set is reserved for transmission of a first bit set, the first bit set comprising a first bit block, the first bit block being used to generate the second signal; the second time-domain resource set comprises K1 first-type time-domain resource subsets, K1 being a positive integer greater than 1; whether the first time-domain resource set is overlapping with the second time-domain resource set is used to determine whether the target time-domain resource set is comprised of the K1 first-type time-domain resource subsets or K1 second-type time-domain resource subsets; at least one second-type time-domain resource subset of the K1 second-type time-domain resource subsets is different from any of the K1 first-type time-domain resource subsets.

In one embodiment, when the first time-domain resource set and the second time-domain resource set are orthogonal, the target time-domain resource set is comprised of the K1 first-type time-domain resource subsets; when the first time-domain resource set and the second time-domain resource set are overlapping, the target time-domain resource set is comprised of the K1 second-type time-domain resource subsets.

In one embodiment, when the first time-domain resource set and the second time-domain resource set are overlapping, the second time-domain resource set comprises a third time-domain resource set and the target time-domain resource set, the third time-domain resource set comprises K3 first-type time-domain resource subset(s) of the K1 first-type time-domain resource subsets, and the target time-domain resource set comprises K2 first-type time-domain resource subset(s) of the K1 first-type time-domain resource subsets, where both K2 and K3 are positive integers less than K1, and a sum of the K2 and K3 equals K1.

In one embodiment, when the first time-domain resource set and the second time-domain resource set are overlapping, the first bit block is used to generate K1 second-type radio sub-signals, and the second radio signal comprises the K1 second-type radio sub-signals, the K1 second-type radio sub-signals being transmitted respectively in the K1 second-type time-domain resource subsets in time domain.

In one embodiment, the second signaling is used to indicate a first PUCCH resource, a time-domain resource occupied by the first PUCCH resource is comprised of the K1 first-type time-domain resource subsets, and the first PUCCH resource adopts a first PUCCH format; the second signal is transmitted in a second PUCCH resource, a time-domain resource occupied by the second PUCCH resource is comprised of the K1 second-type time-domain resource subsets, and the second PUCCH resource adopts a second PUCCH format, the first PUCCH format being different from the second PUCCH format.

In one embodiment, the second signaling is used to indicate a first PUCCH resource, and a time-domain resource occupied by the first PUCCH resource is comprised of the K1 first-type time-domain resource subsets; the second signal is transmitted in a second PUCCH resource, and a time-domain resource occupied by the second PUCCH resource is comprised of the K1 second-type time-domain resource subsets; the first PUCCH resource and the second PUCCH resource occupy equal numbers of resource blocks (RBs) in frequency domain.

In one embodiment, of the K1 first-type time-domain resource subsets there is at least one first-type time-domain resource subset occupying a larger number of OFDM symbols than any second-type time-domain resource subset of the K1 second-type time-domain resource sub sets.

In one embodiment, the second transmitter 1401 transmits a third radio signal, and the second transmits a fourth radio signal; the first signaling comprises configuration information of the third radio signal, and the second signaling comprises configuration information of the fourth radio signal, the first signal comprises feedback for the third radio signal, and the second signal comprises feedback for the fourth radio signal.

In one embodiment, the second transmitter 1401 comprises at least the first four of the antenna 420, the transmitter 418, the multi-antenna transmitting processor 471, the transmitting processor 416 and the controller/processor 475 in Embodiment 4.

In one embodiment, the second receiver 1402 comprises at least the first four of the antenna 420, the receiver 418, the multi-antenna receiving processor 472, the receiving processor 470 and the controller/processor 475 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The first node in the present disclosure includes but is not limited to mobile phones, tablet computers, notebooks, network cards, low-consumption equipment, enhanced MTC (eMTC) terminals, NB-IOT terminals, vehicle-mounted communication equipment, vehicles, automobiles, RSU, aircrafts, airplanes, unmanned aerial vehicles, telecontrolled aircrafts, etc. The second node in the present disclosure includes but is not limited to macro-cellular base stations, micro-cellular base stations, home base stations, relay base station, eNB, gNB, Transmitter Receiver Point (TRP), GNSS, relay satellite, satellite base station, airborne base station, RSU, unmanned ariel vehicle, test equipment like transceiving device simulating partial functions of base station or signaling tester, and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first receiver, receiving a first signaling and a second signaling; the first signaling is used to determine a first time-domain resource set, and the second signaling is used to determine a second time-domain resource set; and
a first transmitter, transmitting a first signal in the first time-domain resource set, and transmitting a second signal in a target time-domain resource set;
wherein the first time-domain resource set is reserved for transmission of the first signal, and the second time-domain resource set is reserved for transmission of a first bit set, the first bit set comprising a first bit block, the first bit block being used to generate the second signal; the second time-domain resource set comprises K1 first-type time-domain resource subsets, K1 being a positive integer greater than 1; whether the first time-domain resource set is overlapping with the second time-domain resource set is used to determine whether the target time-domain resource set is comprised of the K1 first-type time-domain resource subsets or K1 second-type time-domain resource subsets; at least one second-type time-domain resource subset of the K1 second-type time-domain resource subsets is different from any of the K1 first-type time-domain resource subsets; when the first time-domain resource set and the second time-domain resource set are orthogonal, the target time-domain resource set is comprised of the K1 first-type time-domain resource subsets; when the first time-domain resource set and the second time-domain resource set are overlapping, the target time-domain resource set is comprised of the K1 second-type time-domain resource subsets.

2. The first node according to claim 1, wherein when the first time-domain resource set and the second time-domain resource set are overlapping, the second time-domain resource set comprises a third time-domain resource set and the target time-domain resource set, the third time-domain resource set comprises K3 first-type time-domain resource subset(s) of the K1 first-type time-domain resource subsets, and the target time-domain resource set comprises K2 first-type time-domain resource subset(s) of the K1 first-type time-domain resource subsets, where both K2 and K3 are positive integers less than K1, and a sum of the K2 and K3 equals K1.

3. The first node according to claim 1, wherein when the first time-domain resource set and the second time-domain resource set are overlapping, the first bit block is used to generate K1 second-type radio sub-signals, and the second radio signal comprises the K1 second-type radio sub-signals, the K1 second-type radio sub-signals being transmitted respectively in the K1 second-type time-domain resource subsets in time domain.

4. The first node according to claim 1, wherein the second signaling is used to indicate a first PUCCH resource, a time-domain resource occupied by the first PUCCH resource is comprised of the K1 first-type time-domain resource subsets, and the first PUCCH resource adopts a first PUCCH format; the second signal is transmitted in a second PUCCH resource, a time-domain resource occupied by the second PUCCH resource is comprised of the K1 second-type time-domain resource subsets, and the second PUCCH resource adopts a second PUCCH format, the first PUCCH format being different from the second PUCCH format.

5. The first node according to claim 2, wherein the second signaling is used to indicate a first PUCCH resource, and a time-domain resource occupied by the first PUCCH resource is comprised of the K1 first-type time-domain resource subsets; the second signal is transmitted in a second PUCCH resource, and a time-domain resource occupied by the second PUCCH resource is comprised of the K1 second-type time-domain resource subsets; the first PUCCH resource and the second PUCCH resource occupy equal numbers of resource blocks in frequency domain.

6. The first node according to claim 2, wherein of the K1 first-type time-domain resource subsets there is at least one first-type time-domain resource subset occupying a larger number of OFDM symbols than any second-type time-domain resource subset of the K1 second-type time-domain resource subsets.

7. The first node according to claim 1, wherein the first receiver receives a third radio signal, and the first receiver receives a fourth radio signal; the first signaling comprises configuration information of the third radio signal, and the second signaling comprises configuration information of the fourth radio signal, the first signal comprises feedback for the third radio signal, and the second signal comprises feedback for the fourth radio signal.

8. The first node according to claim 1, wherein the first time-domain resource set comprises M1 first-type time-domain resource subsets, the first signal comprises M1 first-type sub-signals, and the M1 first-type sub-signals are transmitted respectively in the M1 first-type time-domain resource subsets, M1 being a positive integer greater than 1.

9. The first node according to claim 1, wherein the second signal is used for bearing K1 repetitions of transmission corresponding to a piece of UCI, K1 being a positive integer greater than 1; all information bits in a piece of UCI that the second time-domain resource set bears are transmitted in the second signal.

10. The first node according to claim 1, wherein the phrase that "at least one second-type time-domain resource subset of the K1 second-type time-domain resource subsets is different from any of the K1 first-type time-domain resource subsets" means at least one of the following:
at least one second-type time-domain resource subset of the K1 second-type time-domain resource subsets occupies a different number of OFDM symbols from those occupied by any first-type time-domain resource subset of the K1 first-type time-domain resource subsets;
any second-type time-domain resource subset of the K1 second-type time-domain resource subsets occupies a different number of OFDM symbols from those occupied by any first-type time-domain resource subset of the K1 first-type time-domain resource subsets.

11. The first node according to claim 2, wherein the first node drops transmitting information bits comprised in the first bit set in the third time-domain resource set, and the first node only transmits information bits comprised in the first bit block in the target time-domain resource set.

12. The first node according to claim 3, wherein there is at least one information bit in the first bit set that does not belong to the first bit block, and the first bit block comprises partial information bits in the first bit set.

13. The first node according to claim 3, wherein the first bit block only comprises information bits used for HARQ-ACK feedback.

14. The first node according to claim 4, wherein the first bit set comprises information bits used for HARQ-ACK feedback, and the first bit set comprises information bits in at least one of a CQI, a PMI, a CRI, an SSBRI, an LI, a PTI, an RSRP, an RSRQ or a SINR.

15. The first node according to claim 3, wherein when the first time-domain resource set and the second time-domain resource set are orthogonal, the second signaling is used to indicate the first PUCCH resource in a first PUCCH resource set, the first PUCCH resource set being configured by an RRC signaling; when the first time-domain resource set and the second time-domain resource set are overlapping, the second signaling is used to indicate the second PUCCH resource in a second PUCCH resource set, the second PUCCH resource set being configured by an RRC signaling.

16. The first node according to claim 1, wherein the K1 first-type time-domain resource subsets respectively correspond to K1 slots.

17. The first node according to claim 1, wherein the K1 second-type time-domain resource subsets respectively correspond to K1 mini-slots, or the K1 second-type time-domain resource subsets respectively correspond to K1 sub-slots, or the K1 second-type time-domain resource subsets respectively correspond to K1 OFDM symbols, or any of the K1 second-type time-domain resource subsets occupies fewer than 14 OFDM symbols.

18. A second node for wireless communications, comprising:
a second transmitter, transmitting a first signaling and a second signaling; the first signaling is used to determine a first time-domain resource set, and the second signaling is used to determine a second time-domain resource set; and
a second receiver, receiving a first signal in the first time-domain resource set, and receiving a second signal in a target time-domain resource set;
wherein the first time-domain resource set is reserved for transmission of the first signal, and the second time-domain resource set is reserved for transmission of a first bit set, the first bit set comprising a first bit block, the first bit block being used to generate the second signal; the second time-domain resource set comprises K1 first-type time-domain resource subsets, K1 being a positive integer greater than 1; whether the first time-domain resource set is overlapping with the second time-domain resource set is used to determine whether the target time-domain resource set is comprised of the K1 first-type time-domain resource subsets or K1 second-type time-domain resource subsets; at least one second-type time-domain resource subset of the K1 second-type time-domain resource subsets is different from any of the K1 first-type time-domain resource subsets; when the first time-domain resource set and the second time-domain resource set are orthogonal, the target time-domain resource set is comprised of the K1 first-type time-domain resource subsets; when the first time-domain resource set and the second time-domain resource set are overlapping, the target time-domain resource set is comprised of the K1 second-type time-domain resource subsets.

19. A method in a first node for wireless communications, comprising:
receiving a first signaling and a second signaling; the first signaling is used to determine a first time-domain resource set, and the second signaling is used to determine a second time-domain resource set; and
transmitting a first signal in the first time-domain resource set, and transmitting a second signal in a target time-domain resource set;
wherein the first time-domain resource set is reserved for transmission of the first signal, and the second time-domain resource set is reserved for transmission of a first bit set, the first bit set comprising a first bit block, the first bit block being used to generate the second signal; the second time-domain resource set comprises K1 first-type time-domain resource subsets, K1 being a positive integer greater than 1; whether the first time-domain resource set is overlapping with the second time-domain resource set is used to determine whether the target time-domain resource set is comprised of the K1 first-type time-domain resource subsets or K1 second-type time-domain resource subsets; at least one second-type time-domain resource subset of the K1 second-type time-domain resource subsets is different from any of the K1 first-type time-domain resource subsets; when the first time-domain resource set and the second time-domain resource set are orthogonal, the target time-domain resource set is comprised of the K1 first-type time-domain resource subsets; when the first time-domain resource set and the second time-domain resource set are overlapping, the target time-domain resource set is comprised of the K1 second-type time-domain resource subsets.

\* \* \* \* \*